United States Patent
Romanenko

(10) Patent No.: US 10,783,042 B2
(45) Date of Patent: Sep. 22, 2020

(54) SYSTEM AND METHOD OF ASSESSING AND MANAGING STORAGE DEVICE DEGRADATION

(71) Applicant: AO Kaspersky Lab, Moscow (RU)

(72) Inventor: Alexander A. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 169 days.

(21) Appl. No.: 16/101,847

(22) Filed: Aug. 13, 2018

(65) Prior Publication Data

US 2019/0303245 A1    Oct. 3, 2019

(30) Foreign Application Priority Data

Mar. 30, 2018   (RU) ............................... 2018111481

(51) Int. Cl.
| | |
|---|---|
| G06F 11/00 | (2006.01) |
| G06F 11/14 | (2006.01) |
| G06F 3/06 | (2006.01) |
| G06F 11/20 | (2006.01) |

(52) U.S. Cl.
CPC ........ G06F 11/1451 (2013.01); G06F 3/0616 (2013.01); G06F 3/0631 (2013.01); G06F 3/0649 (2013.01); G06F 3/0653 (2013.01); G06F 3/0689 (2013.01); G06F 11/008 (2013.01); G06F 11/1464 (2013.01); G06F 11/2094 (2013.01)

(58) Field of Classification Search
CPC ............... G06F 11/1451; G06F 3/0649; G06F 11/1464; G06F 11/008; G06F 3/0689; G06F 3/0631; G06F 3/0653; G06F 3/0616; G06F 11/2094; G06F 11/14; G06F 3/0619; G06F 3/065; G06F 3/0679; G06F 3/0688; G06F 11/1458; G06F 11/22; G06F 12/16

USPC ....................................................... 714/6.32

See application file for complete search history.

(56) References Cited

U.S. PATENT DOCUMENTS

| | | | |
|---|---|---|---|
| 8,341,121 B1 | 12/2012 | Claudatos et al. | |
| 8,760,780 B1 * | 6/2014 | Brooker | G11B 27/36 360/31 |
| 9,183,067 B2 | 11/2015 | Nakatsugawa et al. | |
| 9,229,796 B1 | 5/2016 | Ma et al. | |
| 9,542,296 B1 | 1/2017 | Engers et al. | |

(Continued)

FOREIGN PATENT DOCUMENTS

WO    99/23562 A1    5/1999

Primary Examiner — Yair Leibovich
(74) Attorney, Agent, or Firm — Arent Fox LLP; Michael Fainberg

(57) ABSTRACT

Disclosed are systems and methods for preserving of data saved on a data storage device. An assessment is made as to the degradation of the data storage device, during which a determination is made of the rate of degradation and the probability of failure of the data storage device. When the probability is greater than a given threshold, the damaged sectors of the data storage device are identified by scanning of the surface of the data storage device. A worth grade (i.e., the value of the saved data to the user) is determined at least for data in sectors close to the damaged sectors on the basis of an analysis of at least the meta-data of the data. A decision is made as to the possible loss of data, and a backup copy is created based on the worth grade of the data and the rate of degradation of the data storage device.

20 Claims, 3 Drawing Sheets

(56) References Cited

U.S. PATENT DOCUMENTS

| | | |
|---|---|---|
| 2006/0215456 A1 | 9/2006 | Chen |
| 2008/0180084 A1 | 7/2008 | Dougherty et al. |
| 2015/0205657 A1* | 7/2015 | Clark .................... G06F 11/008 |
| | | 714/47.3 |
| 2016/0205183 A1 | 7/2016 | Liu et al. |
| 2018/0032405 A1 | 2/2018 | Chen et al. |

* cited by examiner

SYSTEM AND METHOD OF ASSESSING AND MANAGING STORAGE DEVICE DEGRADATION

CROSS-REFERENCE TO RELATED APPLICATIONS

This application claims benefit of priority under 35 U.S.C. 119(a)-(d) to a Russian Patent Application No. 2018111481 filed on Mar. 30, 2018, which is incorporated by reference herein.

FIELD OF TECHNOLOGY

The present disclosure relates to computer technology, more specifically to systems and methods for assessing and managing degradation of storage devices.

BACKGROUND

Computer systems depend to a substantial degree on data storage devices (such as magnetic hard disks), which store various data, including files of the operating systems, applications, system data, user data, and so forth. For a trouble-free functioning of a computing system it is important for the data storage devices to work properly, but the reality is that data storage devices fail or malfunction over time (for example, due to bad sectors or file system errors), oftentimes in an abrupt manner. In this regard, a problem arises in that the unexpected malfunctioning of a data storage device (hard disk) may result in damaging and/or total loss of stored data/files containing valuable information of the user. Such a hard disk failure may result in the inability to boot the computer (for example, due to damage/loss of critical files for booting the operating system (OS)). The failure of a hard disk may often go undetected for a long time (for example, until a damaged file caused by failure of the hard disk is discovered).

One of the known solutions is the use of backup copying and/or data restoration computer programs, which are able to restore damaged files or restore data on the entire hard disk. Nevertheless, these solutions suffer from one of more of the following drawbacks: first, the backup copy of a damaged file may be too old, when the damaged file does not exist in the backup copy or the damaged file has an old version which is unsuitable for use. Secondly, the restoration itself may result in further loss of certain data. As a result of this, the user will not know which files are damaged, and which are restored. Thirdly, the backup copy might not include a damaged file, if for example the damaged file was excluded or blocked during the making of the backup copy. Fourthly, if a hard disk failure has occurred such that the operating system is not booted on the computer, the user might not be able to restore anything.

Thus, the sudden failure of a computer hard disk (HDD) will result in the users losing various data or an inability to boot the operating system, which will also result in loss of data. It should be noted that the same problem may exist with computer hardware components or parts thereof such as a solid-state disk (SSD), a random-access memory (RAM), a central processing unit (CPU) and video cards. Therefore, the problem involves a timely notification of the user as to a possible failure of a particular hardware component and then providing an opportunity to preserve essential user data or protect it against loss.

Accordingly, it is necessary to improve the existing methods and systems of data security by creating a solution for the timely warning of a data loss due to possible malfunctioning of a hard disk or other computer components. Furthermore, another urgent problem to be solved is the possibility of prioritizing data (files) to ensure the integrity of the most important data when it is not possible to preserve all the data due to lack of the needed time or when it is not necessary to preserve data with the lowest priority. The present disclosure makes it possible to solve the aforementioned drawbacks and problems.

SUMMARY

Aspects of the present disclosure has been realized in view of the above-described problems, and the goal of the present disclosure is to prevent loss of the most important data for a user when it is not possible to preserve all the data, and then providing the most preferable variants for protecting data against possible loss, including saving the data on another storage medium (data storage device).

According to the method and the system disclosed here, a timely diagnostics of the data storage device (hereafter also, the hard disk) is done, followed by a timely notification of the user as to a possible loss of the corresponding data (files) and providing a choice of protection procedures against possible data loss, having the option of carrying out procedures for preservation of certain data in automatic mode.

The technical result consists in preventing a loss of data due to possible malfunctioning of a data storage device by assessing the degradation of a data storage device with subsequent identification of damaged sectors of the data storage device, determination of the most valuable data, and making a backup copy thereof.

Another technical result of the present disclosure is the preservation of the most valuable data due to possible malfunctioning of a data storage device by making a map of the data locations, determining the value of the data, and preserving data according to the ascertained value of the data.

In one exemplary method, a computer-implemented method for preserving data saved on a storage device, the method comprising: receiving information specifying a state of the storage device; determining a degradation assessment of the storage device based on the received information, wherein the degradation assessment comprises a degradation rate and a probability of failure of the storage device; responsive to determining that the probability of failure is greater than a given threshold, identifying one or more damaged sectors of the storage device by scanning a surface of the storage device; determining a worth grade of data saved in sectors adjacent to the damaged sectors based on an analysis of metadata of the saved data; determining a backup option for the preservation of the data based on the worth grade of the data and the degradation rate of the storage device; and creating a backup copy of the data based on the determined backup option.

In another exemplary aspect, the method further comprises: generating a map of malfunctioning sectors on a time scale to determine most-heavily damaged portions of the storage device; and assigning, based on the map, a highest priority to data from the most-heavily damaged portions of the storage device.

In another exemplary aspect, the method further comprises: generating a map of data locations associated with the storage device, wherein the map of data locations is generated based on one or more correlations between physical representations and logical representations of the data on the storage device; and identifying the data saved in sectors adjacent to the damaged sectors of the storage device based on the generated map.

In another exemplary aspect, the one or more correlations between the physical representations and logical representations of the storage device are formed by: determining a logical arrangement of the data on the storage device using an analysis module of a file system, and determining a physical arrangement of the data on the storage device using a diagnostic module.

In another exemplary aspect, the information specifying the state of the storage device is received from corresponding information sources comprising at least one of a computer device communicatively coupled to the storage device, a diagnostic module, and a service program configured to gather and review information associated with a state of the storage device, operations of the storage device, and characteristics of the storage device.

In another exemplary aspect, the service program is configured to interact with a Self-Monitoring, Analysis and Reporting Technology (S.M.A.R.T.) module of the storage device to obtain a first parameter associated with the degradation of the storage device and a second parameter associated with an operating time of the storage device.

In another exemplary aspect, the storage device comprises at least one of a hard disk drive, a solid-state disk, and a flash drive.

In another exemplary aspect, the information specifying the state of the storage device is received from an external server configured to save information about the storage device.

In another exemplary aspect, the received information comprises performance information of the storage device and parameters of the storage device.

In another exemplary aspect, the received information comprises at least one of (i) information specifying parameters of the storage device based on one or more Self-Monitoring, Analysis and Reporting Technology (S.M.A.R.T.) attribute values obtained from one or more S.M.A.R.T. counters; (ii) information specifying a temperature reading of the storage device; (iii) information specifying results of previous degradation assessments of the storage device; (iv) historical information on operations of the storage device; and (v) information specifying a use intensity of the storage device.

In another exemplary aspect, creating the backup copy of the data based on the determined backup option further comprises at least one of: creating the backup copy of the data in temporary cloud storage; creating the backup copy of the data in a local data storage device; selecting and replacing the storage device with a second storage device, wherein the backup copy of the data is stored on the second storage device; and transmitting a notification to a user indicating a possible loss of data due to malfunction of the storage device and an indication of a backup copy location.

In another exemplary aspect, the worth grade of the saved data is determined based on metadata indicating at least one of: a frequency of use of the data, a time and date of creation of the data, a time and date of last modification of the data, an author of the data, and a presence of restrictions on use of the data.

In another exemplary aspect, the worth grade of the saved data is further determined based on a type of files in the saved data, a location of the data, and a relationship with an application of an operating system.

In another exemplary aspect, a system for preserving data saved on a storage device comprises: a storage device and a processor configured to: receive information specifying a state of the storage device; determine a degradation assessment of the storage device based on the received information, wherein the degradation assessment comprises a degradation rate and a probability of failure of the storage device; responsive to determining that the probability of failure is greater than a given threshold, identify one or more damaged sectors of the storage device by scanning a surface of the storage device; determine a worth grade of data saved in sectors adjacent to the damaged sectors based on an analysis of metadata of the saved data; determine a backup option for the preservation of the data based on the worth grade of the data and the degradation rate of the storage device; and create a backup copy of the data based on the determined backup option.

In another exemplary aspect, non-transitory computer readable medium comprising computer executable instructions for performing systems and methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
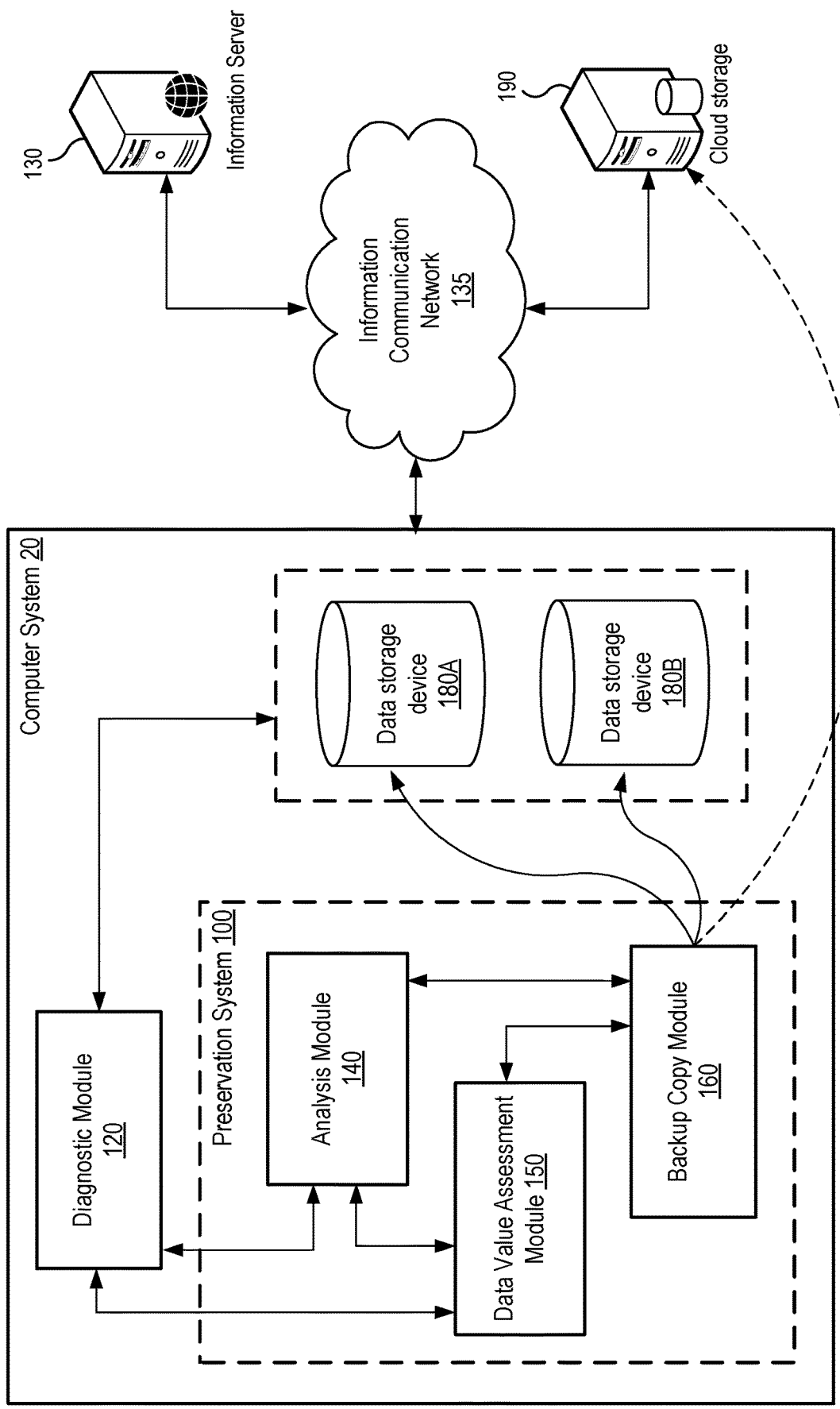
FIG. 1 illustrates a block diagram and the relations between the means of the system of preservation of data saved on a data storage device.

Exemplary aspects are described herein in the context of a system, method, and computer program product for preserving data stored on a data storage device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure address the preservation of the information or data of a user by backup copying on the basis of the determined probability of failure of a data storage device. Here and below in the text, data storage device is understood to mean first and foremost an information repository such as a hard disk drive (HDD), but at the same time the data storage device may be understood to mean such devices as a disk array (Redundant Array of Independent Disks, RAID), a solid-state disk (SSD), a USB drive, a random-access memory (RAM), a flash memory, and other means able to store information, and to which the present disclosure is applicable in at least one variant aspect.

Several characteristics of the invention shall be disclosed in the description of exemplary aspects of the present disclosure.

One of the characteristics of the proposed technique is a set of applicable solutions—when both a timely diagnostics and a timely offering of variants for preservation of data from possible loss are present, either all of the data or the most valuable data. The timeliness of a diagnostics is achieved by the selection of a frequency of assessment of the degradation (the probability of failure) of the data storage device which allows one to forestall the complete damaging of the data storage device and the loss of the saved data (at least the most valuable data).

Another characteristic of the proposed technique is the possibility of determining the location of valuable data (or files) of the user by determining their specific location on the data storage device on the basis of constructing a map of the location of files in the data storage device, followed by analysis of the possible loss of valuable data in the event of failure of the data storage device. By valuable data is meant data which is the most important to the user and which requires priority preservation. Valuable data may be defined either by the actual user of the computer system or be determined by the proposed technology. In the event of the determining of the valuable data (i.e., in terms of its value to the user) by the disclosed technique, this determination is done on the basis of an analysis of at least the meta-data of said data, and in one variant aspect one uses predetermined rules for assessing the value of the data.

It should be noted that the term "data" and the term "file" are interchangeable in the context of the present specification.

Yet another characteristic of the proposed technique is the possibility of a gradation of the risks of malfunction of a data storage device for a subsequent decision as to the protection or preservation of the data, including the valuable data. The gradation of risks may be based on such criteria as the type of files, the rate of degradation of the data storage device, the intensity of use of the data storage device and the temperature readings of the data storage device. In one variant, when assessing the rate of degradation one forms a map of the malfunctioning of portions of the data storage device on a time scale to determine the sectors which are damaged and the sectors most vulnerable to a malfunction (for example, sectors adjacent to damaged ones). Likewise, this map is further used to establish the highest priority for the preservation of valuable data or all data from these portions of the data storage device.

A further characteristic of the proposed technique is also the possible search for data duplications and their subsequent removal.

In general, operations of the proposed technology appears as follows. An inspection of the data storage device is done in order to assess the degradation/wear of the data storage device, especially the surface of the physical disks or the flash memory cells (for example, the finding of "broken" or "dying" clusters). By assessment is meant the checking and analysis of at least the S.M.A.R.T. parameters of the data storage device, including information from the temperature sensor, this inspection being done either constantly or with a certain frequency. During the inspection, a map of the data storage device may be constructed if necessary for analysis of the wear. This map makes it possible to match up the saved data with the corresponding sectors of the data storage device, i.e., determine the locations where information is written in said device.

After this, using the results of this assessment, the proposed technique makes an analysis of the sectors of the data storage device in order to determine the data saved in them with the aid of the mentioned map and to then select a suitable solution for preserving the data. During the analysis, the most valuable data for the user is also determined, for which a priority may then be established for its preservation (prioritized). In one variant, the value is determined on the basis of meta-data of the files, in particular on the basis of the type of file, the time of creation or the last editing, the place of storage of the file, such as in a folder marked by the user as being the most important, or on the basis of a gradation of importance (value) of the data, and so forth. The determination of the saved data includes at least a determination of the type of files, their location (folders, subfolders and applications) and their affiliation with a particular application. After determining the saved data, the user is informed as to the possible loss of the data and the possible variants for protecting against the loss, i.e., the preservation of the data (backup copying). The backup copying of data may be either partial (for example, if there is not much free space, and/or if not all data is valuable) or complete, and the place of the preservation may also be determined either by the user or by the described system and/or technique itself. For example, the place for transfer of the data or for backup copying may be: another place on the same data storage device, in which case actions may be taken to restrict access to the damaged portion (sectors) of the data storage device; a second (another) data storage device which is already connected to the computer system; a "cloud" storage, i.e., a remote data storage device.

It is also possible for the user to designate specific files or folders whose storage needs to be monitored on the data storage device and a backup copying of the data and/or a notification of the user performed in the event of determining a possible loss.

Moreover, in the event that the variant of transfer/preservation of the data is not possible at once, the disclosed system may restrict the operations of the data storage device to the receiving of instructions from the user and notify the user as to this restriction, while the notification may also contain information as to the minimal requirements for the data storage device and where to buy such devices, for example, by referral to specialized Internet resources such as Yandex Market.

FIG. 1 is a block diagram of a system for preserving data saved on a data storage device upon determining the probability of failure of the data storage device according to an exemplary aspect (hereafter, system of preservation 100). The system of preservation 100 performs an inspection of the data storage device in order to assess its degradation (wear) in order to determine the probability of failure and perform the following actions addressed to ensuring the integrity of the most valuable data of the user. The system of preservation 100 is realized with the aid of a computer system, such as the one presented in FIG. 3. In one aspect, the system of preservation 100 contains an analysis module 140, a data assessment module 150 and a backup copy module 160, wherein the system of preservation 100 interacts with information sources, such as a diagnostic module 120, and is connected to at least one data storage device, such as the device 180a.

The inspection performed on the data storage device 180a (hereafter, the storage device 180a) allows the system of preservation 100 to ensure a timely preservation of at least the most valuable data of the user being saved on the indicated device 180a. For this, the system of preservation 100 receives information as to the state of the device 180a from the diagnostic module 120. The information received includes at least information such as information on the performance and the basic parameters of the device 180a. Additional information is information about the physical or logical arrangement of the data (files) on the storage device 180a. It should be noted that the inspection may be done either constantly or periodically with specified intervals of time, and the interval of time may be specified dynamically, e.g., depending on the wear of the device 180a. The diagnostic module 120 performs a gathering of information at least regarding the S.M.A.R.T. attributes, the temperature of the storage device 180a and the working surface of the storage device 180a.

Examples of the S.M.A.R.T. attributes are the parameters which are counted from certain S.M.A.R.T. counters. These counters will indicate problems in the operation of the storage device 180a. Examples of such counters are: (0x0A) Spin-Up Retry Counter which stores a total count of spin start attempts to reach full operational speed (i.e., in cases in which the first spin start attempt was unsuccessful), (0xB8) End-to-End error counter indicating a count of parity errors which occur in the data path to the media via the drive's cache RAM, (0xBB) Reported Uncorrectable Errors counter containing a count of errors that could not be recovered using hardware ECC, (0xBC) Command Timeout indicating a count of aborted operations due to hard disk drive timeout, (0xC5) Current Pending Sector Count indicating a count of "unstable" sectors (e.g., that are waiting to be remapped, because of unrecoverable read errors), (0xC6) Uncorrectable Sector Count indicating a total count of uncorrectable errors when reading/writing a sector, (0xC8) Write Error Rate indicating a total count of errors when writing a sector, (0xDC) Disk Shift indicating a distance the disk has shifted relative to the spindle (e.g., due to shock or temperature), and (0xC7) UltraDMA CRC Error Count indicating a count of errors in data transfer via the interface cable as determined by an Interface Cyclic Redundancy Check (ICRC).

For the gathering of this information, the diagnostic module 120 can be realized as a combination of hardware and software, as well as in one particular single aspect. Examples of software are the service programs (utilities): "HD Tune", "HDD Scan", "Data Lifeguard Diagnostics", "Everest" and "CrystalDiskInfo", as well as the standard Windows operating system (OS) program, or the service programs directly from the companies making data storage devices (such as Seagate and Western Digital). Thus, for example, the utility "CrystalDiskInfo" provides information on the state of a hard disk which supports the S.M.A.R.T. technology. The utility "CrystalDiskInfo" carries out a gathering and presentation of detailed information on the general state of a hard disk (such as the firmware version, the serial number, the standard, the interface, the general operating time, and so forth), also including information on the temperature. The utility "HDD Scan" allows the gathering of information on data storage devices of type HDD, RAID, USB-Flash. The gathering of information is done with the aid of the S.M.A.R.T. technology, which is used by data storage devices, and also takes account of the readings of the temperature sensors of the hard disks and performs a comparative read and write test.

It should be noted that the diagnostic module 120 may be realized either with the aid of known solutions or in the context of the realization of the present disclosure, wherein it will have at least a similar functionality to the means presented as examples above, and also the ability to obtain information about the sectors of the storage device 180a and the information arranged in them. In particular, the diagnostic module 120 will carry out a reading of the indicators of the S.M.A.R.T. attributes and the temperature, which it will then present to the system of preservation 100, specifically to the analysis module 140. It should be noted that the S.M.A.R.T. technology is a component of the firmware of the data storage device which makes it possible to obtain information as to the state of the data storage device. In the general operation, the diagnostic module 120 during its interaction with the S.M.A.R.T. technology obtains from the data storage device a data structure containing information on the attributes and their values, and carries out a deciphering of the tabular structure. By deciphering is meant placing the information in the necessary form for subsequent working with it. It should also be noted that the S.M.A.R.T. attributes may be conventionally divided into two groups: parameters allowing a determination of the degradation of the storage device and parameters enabling a determination of the operating time and performance of the storage device. The operating time is how many hours it has worked, how many on/off cycles, how many spindle stop cycles were carried out, how many drops there were by the G-sensor, and so on.

Moreover, the diagnostic module 120 is able to access the storage device 180a in order to analyze the sectors of the storage device 180a for the presence of information in them, for example, on the basis of diagnostic queries (commands) corresponding to the data storage device being analyzed. Thus, for example, a data storage device of Seagate type interacts with one set of diagnostic commands developed by its manufacturer, while a data storage device of Western Digital type interacts with another set of diagnostic commands. These command sets may be obtained from external sources, such as an information server 130 through an information communication network 135 (such as the Internet). In general, the information server 130 contains and provides (if available) information on the query that is needed by the diagnostic module 120 and other means of the system of preservation 100.

The diagnostic module 120 may also gather and provide information on the results of previous assessments of the degradation of the storage device 180a, i.e., the history of the results of previous verifications. Moreover, the diagnostic module 120 is able to request from the information server 130 historical information on the operation of similar data storage devices that was previously gathered on the basis of information on the assessment of the state of similar data storage devices provided by similar diagnostic module, for example.

In yet another variant aspect, the diagnostic module 120 gathers information directly through interaction with the controller of the storage device 180a by means of a driver responsible for interaction with the storage device 180a, or directly with counters, i.e., bypassing the S.M.A.R.T. technology. During this interaction, the controller transmits information as to the damaged sectors on each plate of the storage device 180a. The controller is a hardware/software unit that controls the data storage device, including the exchanging of data between it and the computer system. The driver is a system program realizing the physical input/output level for working with a specific device (class of devices) or a particular resource.

The analysis module 140, having obtained the information from the diagnostic module 120, performs an assessment of the degradation of the data storage device, during which it determines the rate of degradation and the probability of a malfunctioning of said storage device 180*a*. The determination of the rate of degradation and the probability of failure is done on the basis of an analysis of the information obtained at least on the parameters of the S.M.A.R.T. attributes, the temperature readings, and/or the history of results of previous assessments in order to identify changes occurring from one assessment to another (verification). The result of the assessment is a determination of the degree of degradation of the data storage device which in one variant aspect may be expressed in the form of a percentage corresponding to the probability. When the degree of degradation surpasses a given threshold, a decision is made as to the imminent malfunctioning of the entire storage device 180*a* or a portion thereof (in the case of hard disks when it is possible for one or more magnetic plates, or a specific portion of the sectors, to malfunction, rather than the entire storage device). During the analysis, a check is made of the values of the parameters of the storage device to see if they conform to the specified operating intervals of the storage device and to determine the worsening of at least one critical parameter of the data storage device. The criticality of the parameters and their ranges of criticality are established empirically during the realization of the disclosed system. For example, critical parameters are such readings as the number of movements of data from one sector to another upon damage thereof (relocation); an increase in temperature readings; the number of terabytes written on an SSD, incorrigible errors (an S.M.A.R.T. attribute), and so on.

Next the analysis module 140 identifies the damaged sectors of the data storage device and forms a map of the malfunctioning of sectors on a time scale for a determination of the portions (or other sectors) of the storage device 180*a* which are most heavily subjected to malfunction. This step makes it possible to determine the rate of degradation of adjacent/nearby sectors to the damaged sectors and to predict their failure. Furthermore, the presence or absence of reserve sectors on the storage device 180*a* is determined. After this, the analysis module 140 sends the information on the damaged sectors and/or damaged portions of the storage device 180*a* to the data value assessment module 150. The rate of degradation is determined, for example, on the basis of a comparison of the last two verifications (assessments) or more and the determination of the increase in the number of damaged sectors. Thus, if the number of damaged sectors has surpassed the given threshold, a decision is made as to the imminent degradation of the storage device and the need to either inform the user or ensure the integrity of the data, or both. Which decision is made depends on the degree of anticipated risk (described below). For this, an instruction is sent to the data value assessment module 150 to identify and determine the places of storage of valuable user data or information contained in certain sectors.

The identification of damaged sectors and adjacent sectors to them is done on the basis of information obtained from the diagnostic module 120, obtained during the diagnostics of the storage device 180*a*, by means of diagnostic commands.

The data value assessment module (hereafter, the data assessment module) 150 is designed to form a map of the location of data on the data storage device, determine the data being kept in sectors adjacent to damaged sectors of the data storage device, and determine the value of the data to the user at least in sectors near the damaged sectors, on the basis of an analysis of the information obtained from the analysis module 140 and the diagnostic module 120, particularly on the basis of meta-data of the user files. By meta-data is meant in particular the data type (graphics, music, documents, video, archives), the time and date of creation or last rewrite of the data, the date of last access to the file, the frequency of use of the data, the time of last access, the storage location (in the operating system area, in sections marked as important by the user), the author of the data, and the presence of restrictions on the use of the data, where by use is meant opening, writing, editing and encryption.

One variant for the formation of the map of the data location on the storage device 180*a* may include determining the logical location of the data (files) on the storage device 180*a* with the help of an analysis of the file system, such as the FAT (File Allocation Table), and in determining the physical location of the data on said device 180*a* by an interaction with the diagnostic module 120, making it possible to perform an analysis of any given sector on said device 180*a* in order to identify the location of data on the device 180*a*. Thus, a correlation is formed between the physical and the logical representation of the data on the storage device 180*a*, which is also presented in the form of the map of the data location. The data location map may be presented in the form of a table of data, containing at least information about a file, a section or sections of allocation of the file in the file system, and the location of the file in the sectors of the storage device 180*a*.

The data assessment module 150 then determines the value of the saved data to the user on the basis of its meta-data or information indicating the value of the data that has been added earlier by the user himself. For example, the user has created a folder in which his most important data is kept. If the user did not previously determine the value of the data in this folder, the value of the data will be determined on the basis of rules of definition. Examples of the rules are: 1) files relating to the Microsoft Office applications package and created during the recent calendar year have a greater value and more priority for preservation; 2) files contained in the Temp folder have the lowest value and the lowest priority; 3) files pertaining to the operating system have a high priority, but the least value to the user. The set of rules is previously prepared and may be updated in the course of the operation of the system of preservation 100. It should be noted that, depending on the aspect, the value of the data may be determined either for all the data contained on the storage device 180*a* or for only a portion of the data; for example, only for that data which is contained in sectors adjacent to damaged sectors of the storage device 180*a*. After determining the value of the data, the data assessment module 150 sends this information and the resulting map of data location to the analysis module 140. It is noted that the term "value of the data" as used herein relates to a worth grade or level of priority of data with respect to one or more users of the storage device. This meaning of "value of the data" is distinguished from the generic meaning of "data value" in the computer science field, for example, a value that is mapped to an assignable variable or data structure.

The analysis module 140 on the basis of the information received from the diagnostic module 120 and the data assessment module 150 makes a decision as to the possible loss of data (especially the user data) and determines a method of action for preservation of the data in dependence on the value of that data and the parameters of degradation of the storage device 180a. The selection of the method of action for preservation of the data takes into account at least the volume of the stored data, the priority of the stored data according to its determined value, and the backup copying location. For example, if a failure is inevitable, a copying of the highest priority data is done to an external data storage device, choosing the fastest and most reliable copying pathway. In another example, if a degradation has been found, but it is still possible to use the storage device, a local copying of the data from adjacent sectors will be done. In yet another example, after a degradation has been determined, it becomes necessary to copy all data with a certain frequency.

In one variant aspect, the analysis module 140 in deciding as to the method of preservation also determines the degree of risk of a loss of valuable data on the basis of information as to the rate of degradation and the intensity of use of the data storage device and the temperature readings. The gradation of risks for determining the degree of risk takes into account various criteria, such as the types of files (data), the rate of degradation of the data storage device, the intensity of use of the storage device and the temperature readings of the storage device.

Thus, one method of protection involves a backup copying of valuable data from sectors adjacent to the damaged ones to another portion of the storage device 180a by the backup copy module 160, it being possible to restrict access to the damaged sectors and the ones adjacent to them, which enables a restriction on writing into that area and a slowing down of the degradation of the storage device 180a. Another method of protection involves copying the necessary data from the storage device 180a onto another (external) storage device, connected to the computer system, such as the data storage device 180b. A third method of protection involves copying data to a cloud storage 190 via a network 135. Yet another criterion for choosing the place of the data copying is the volume of data that needs to be preserved.

The backup copy module 160 carries out the backup data copying in dependence on the value of said data, the volume thereof, or according to certain data protection solutions on instruction from the analysis module 140 or the data assessment module 150.

It should be noted that yet another characteristic of the disclosed technique and in particular that of the system of preservation is the possibility of identifying data duplications contained on the data storage device. For example, the user has many copies of the identical photographs on the data storage device in different folders, and the data storage device is allocating a large number of sectors to the storing of those photographs, which could be used for storing other data. After identifying this data on the basis of the map constructed for the location of data, aspects of the present disclosure makes it possible to form a single copy of the data on the storage device, and delete the other copies. It is also possible to make an additional copy on an external data storage device for preservation. Thus, aspects of the present disclosure makes it possible to optimize the place of storage on the data storage device.

Figure 2:
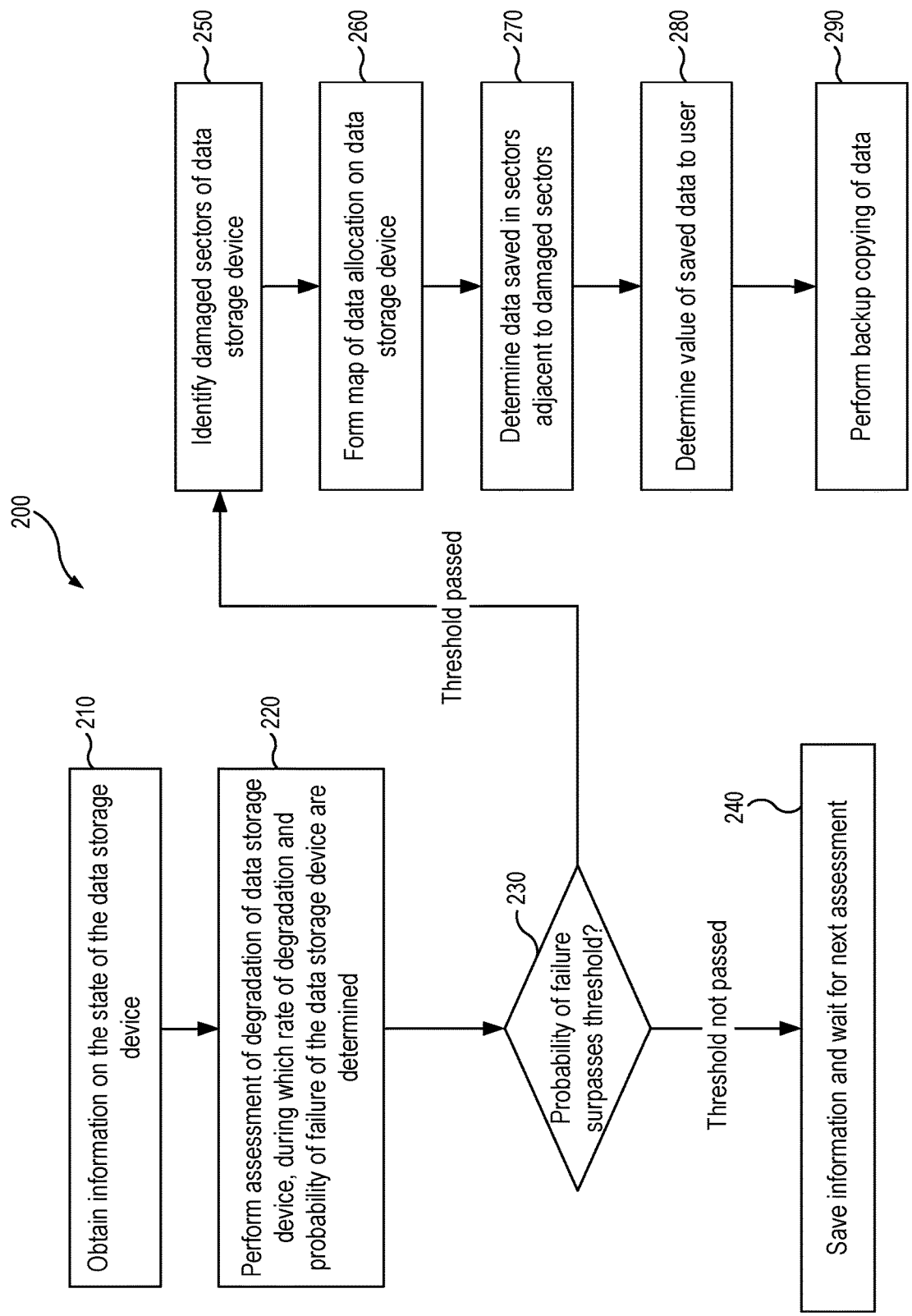
FIG. 2 illustrates a block diagram containing the method of preservation of data saved on a data storage device upon determining the probability of failure of the data storage device.

FIG. 2 illustrates a block diagram of a particular variant aspect, specifically, a method of preservation of data saved on a data storage device upon determining the probability of failure of that data storage device. In one variant aspect, the method of preservation of data saved on a data storage device is realized with the aid of the means of the system of preservation 100. In a particular aspect, data is also understood to include user data.

In step 210 information is obtained as to the state of the data storage device from the diagnostic module 120, which carries out a gathering of that information. The information obtained contains at least one of the following pieces of information, but is not limited to them: (a) information on the parameters of the data storage device from the S.M.A.R.T. application, (b) information on the temperature readings of the data storage device, (c) information on the results of previous assessments of the degradation of the data storage device, (d) historical information on the operations of the data storage device, and (e) information on the intensity of use of the data storage device.

In some aspects, information specifying the state of the storage device is received from corresponding information sources includes at least one of a computer device communicatively coupled to the storage device, a diagnostic module, and a service program configured to gather and review information associated with a state of the storage device, operations of the storage device, and characteristics of the storage device. In some aspects, the service program is configured to interact with a Self-Monitoring, Analysis and Reporting Technology (S.M.A.R.T.) module of the storage device to obtain a first parameter associated with the degradation of the storage device and a second parameter associated with an operating time of the storage device.

In step 220 the analysis module 140 is used to assess the degradation of the data storage device, during which a determination is made for the rate of degradation and the probability of failure of the data storage device. The determination of the rate of degradation and the predicting of the probability of failure is done, as mentioned above, on the basis of an analysis of the information obtained at least on the parameters of the S.M.A.R.T. attributes, the temperature readings, and/or the history of results of previous assessments for identification of changes occurring from one assessment to another. The result of the assessment is a determination of the degree of degradation of the data storage device, which is determined in step 230 and may be expressed in the form of a percentage. When it is determined that the threshold has not been surpassed, then in step 240 the obtained information is saved and the verification is finished.

In some aspects, the analysis module 140 determines a degradation assessment of the storage device based on the received information, which includes a degradation rate and a probability of failure of the storage device.

In a particular aspect, in step 240 it is also possible to perform an analysis of damaged sectors and adjacent sectors in order to form the history of results of the assessment for later assessments.

Otherwise, when it is determined in step 230 that the given threshold has been surpassed, a decision is made as to the imminent failure of the data storage device. It should be noted that, during the analysis, a check is done to see whether the values of the parameters of the storage device conform to the specified working intervals of the storage device and whether at least one critical parameter of the data storage device has gotten worse. The criticality of the parameters and their ranges of criticality are established empirically during the realization of the described system. After finding a surpassing of the threshold, the method moves on to step 250.

In step 250 the damaged sectors of the data storage device are identified and a map is formed for the failure of the sectors on a time scale for determining the portions (or other sectors) of the data storage device which are most subject to failure. For this, the analysis module 140 interacts with the diagnostic module 120. After this, the method moves on to step 260.

In some aspects, responsive to determining that the probability of failure is greater than a given threshold, the analysis module 140 may identify one or more damaged sectors of the storage device by scanning a surface of the storage device. In some aspects, analysis module may generate a map of malfunctioning sectors on a time scale to determine most-heavily damaged portions of the storage device, and then assign, based on the map, a highest priority to data from the most-heavily damaged portions of the storage device. In other aspects, the analysis module may generate a map of data locations associated with the storage device, wherein the map of data locations is generated based on one or more correlations between physical representations and logical representations of the data on the storage device, and then identify the data saved in sectors adjacent to the damaged sectors of the storage device based on the generated map. The one or more correlations between the physical representations and logical representations of the storage device can be formed by determining a logical arrangement of the data on the storage device using an analysis module of a file system, and then determining a physical arrangement of the data on the storage device using a diagnostic module.

In step 260 the locations of storage of valuable user data or information contained in certain sectors are identified and determined. The identification of damaged sectors and sectors adjacent to them is done on the basis of information obtained from the diagnostic module 120, which was obtained during the diagnostics of the data storage device with the aid of diagnostic commands. The identified information, especially the meta-data of the files, makes it possible to form the map of data location on the data storage device. The map so formed relates the information about the logical location of the data and its physical location on the data storage device.

In step 270 the data stored in sectors adjacent to damaged sectors of the data storage device is determined with the aid of the data location map so formed. After the determination of the data, in step 280 the value of that data is determined for the user at least in sectors close to the damaged sectors. In one variant, the value of the data is regulated on the basis of rules of definition. The necessary method of actions for preservation of the data is then determined in dependence on the determined value of that data and the indicators of degradation of the data storage device.

Thus, the determination of the method of actions for the preservation of the data takes into account such criteria as the degree of degradation of the data storage device, the potential time of operation of the data storage device, the temperature readings of the data storage device, the location for the backup copying of data, the stability and speed of transmission of network data for the backup copying to an external remote storage device, and others. These criteria make it possible to determine the method of actions for the preservation of data, especially the volume of data being saved, the priority of the data being saved, and the backup copying location.

In some aspects, the data value assessment module 150 may determine a "worth grade" of data saved in sectors adjacent to the damaged sectors based on an analysis of metadata of the saved data. The worth grade (also referred to herein simply as the value of the data) represents a value, to the user, of certain data stored in the storage device. In some aspects, the data value assessment module 150 may determine the worth grade of the saved data based on metadata indicating at least one of: a frequency of use of the data, a time and date of creation of the data, a time and date of last modification of the data, an author of the data, and a presence of restrictions on use of the data. In another aspect, the data value assessment module 150 may determine the worth grade of the saved data further based on a type of files in the saved data, a location of the data, and a relationship with an application of the operating system.

In some aspects, the analysis module 140 may determine a backup option for the preservation of the data based on the worth grade of the data and the degradation rate of the storage device. For example, the determined backup option can be to create the backup copy of the data in a local data storage device, or in "temporary" cloud storage. In another example, the determined backup option can be to select and replace the storage device with a new (second) storage device, and then store the backup copy of the data on that second storage device. In another example, the determined backup option may include the transmission of a notification to a user indicating a possible loss of data due to malfunction of the storage device and an indication of a backup copy location.

In step 290 the backup copying of the user data is carried out in accordance with the determined method of actions for the preservation of data. In some aspects, the backup copy module 160 may create a backup copy of the data based on the determined backup option.

Figure 3:
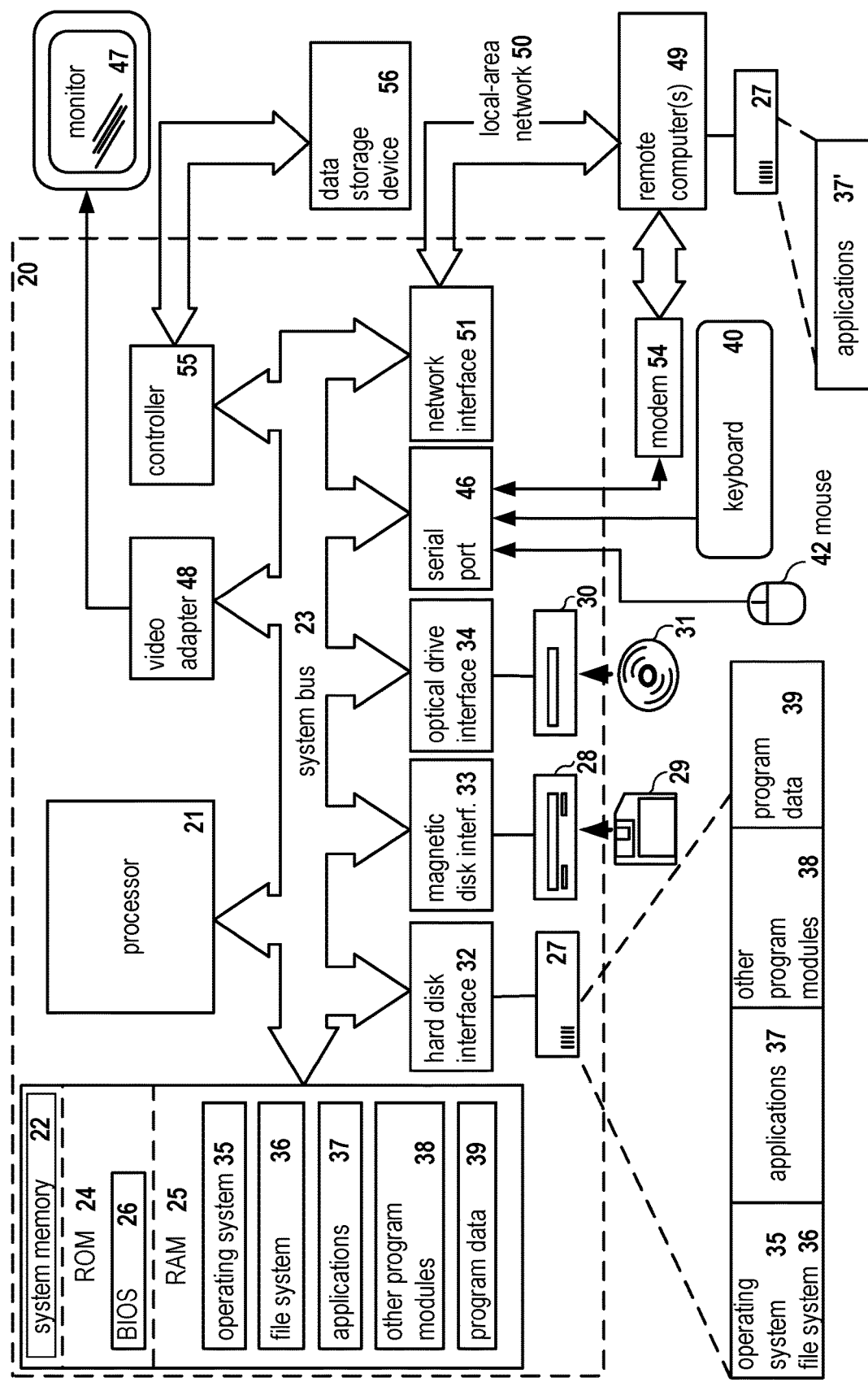
FIG. 3 is a block diagram of a computer system on which the disclosed system and method can be implemented according to an exemplary aspect.

FIG. 3 is a block diagram illustrating a computer system 20 on which aspects of systems and methods for preserving data stored on a data storage device may be implemented in accordance with an exemplary aspect.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for preserving data saved on a storage device, the method comprising:
   receiving information specifying a state of the storage device;
   determining a degradation assessment of the storage device based on the received information, wherein the degradation assessment comprises a degradation rate of the storage device and a probability of failure of the storage device;
   responsive to determining that the probability of failure is greater than a given threshold, identifying one or more damaged sectors of the storage device by scanning a surface of the storage device;
   determining a worth grade of data saved at least in sectors adjacent to the damaged sectors of the storage device based on an analysis of metadata of the data saved on the storage device;
   determining at least one backup option for the preservation of the data saved on the storage device based on the determined worth grade of data and the degradation rate of the storage device; and
   creating a backup copy of the data saved on the storage device based on the determined at least one backup option.

2. The method of claim 1, further comprising:
generating a map of malfunctioning sectors on a time scale to determine most-heavily damaged portions of the storage device; and
assigning, based on the map, a highest priority to data from the most-heavily damaged portions of the storage device.

3. The method of claim 1, further comprising:
generating a map of data locations associated with the storage device, wherein the map of data locations is generated based on one or more correlations between physical representations and logical representations of the data saved on the storage device; and
identifying the data saved in the sectors adjacent to the damaged sectors of the storage device based on the generated map.

4. The method of claim 3, wherein the one or more correlations between the physical representations and logical representations of the storage device are formed by:
determining a logical arrangement of the data saved on the storage device using an analysis module of a file system, and determining a physical arrangement of the data on the storage device using a diagnostic module.

5. The method of claim 1, wherein the information specifying the state of the storage device is received from corresponding information sources comprising at least one of a computer device communicatively coupled to the storage device, a diagnostic module, and a service program configured to gather and review information associated with a state of the storage device, operations of the storage device, and characteristics of the storage device.

6. The method of claim 5, wherein the service program is configured to interact with a Self-Monitoring, Analysis and Reporting Technology (S.M.A.R.T.) module of the storage device to obtain a first parameter associated with the degradation of the storage device and a second parameter associated with an operating time of the storage device.

7. The method of claim 1, wherein the storage device comprises at least one of a hard disk drive, a solid-state disk, and a flash drive.

8. The method of claim 1, wherein the information specifying the state of the storage device is received from an external server configured to save information about the storage device.

9. The method of claim 1, wherein the received information comprises performance information of the storage device and parameters of the storage device.

10. The method of claim 1, wherein the received information comprises at least one of (i) information specifying parameters of the storage device based on one or more Self-Monitoring, Analysis and Reporting Technology (S.M.A.R.T.) attribute values obtained from one or more S.M.A.R.T. counters; (ii) information specifying a temperature reading of the storage device; (iii) information specifying results of previous degradation assessments of the storage device; (iv) historical information on operations of the storage device; and (v) information specifying a use intensity of the storage device.

11. The method of claim 1, wherein creating the backup copy of the data saved on the storage device based on the determined backup option further comprises at least one of:
creating the backup copy of the data in temporary cloud storage;
creating the backup copy of the data in a local data storage device;
selecting and replacing the storage device with a second storage device, wherein the backup copy of the data is stored on the second storage device; and
transmitting a notification to a user indicating a possible loss of data due to malfunction of the storage device and an indication of a backup copy location.

12. The method of claim 1, wherein the worth grade of the data saved at least in the sectors adjacent to the damaged sectors of the storage device is determined based on metadata indicating at least one of: a frequency of use of the data, a time and date of creation of the data, a time and date of last modification of the data, an author of the data, and a presence of restrictions on use of the data.

13. The method of claim 12, wherein the worth grade of the data saved at least in the sectors adjacent to the damaged sectors of the storage device is further determined based on a type of files in the saved data, a location of the data, and a relationship with an application of an operating system.

14. A system for preserving data saved on a storage device, the system comprising:
a storage device;
a processor configured to:
receive information specifying a state of the storage device;
determine a degradation assessment of the storage device based on the received information, wherein the degradation assessment comprises a degradation rate of the storage device and a probability of failure of the storage device;
responsive to determining that the probability of failure is greater than a given threshold, identify one or more damaged sectors of the storage device by scanning a surface of the storage device;
determine a worth grade of data saved at least in sectors adjacent to the damaged sectors of the storage device based on an analysis of metadata of the data saved on the storage device;
determine at least one backup option for the preservation of the data saved on the storage device based on the determined worth grade of data and the degradation rate of the storage device; and
create a backup copy of the data saved on the storage device based on the determined at least one backup option.

15. The system of claim 14, wherein the processor is further configured to:
generate a map of malfunctioning sectors on a time scale to determine most-heavily damaged portions of the storage device; and
assign, based on the map, a highest priority to data from the most-heavily damaged portions of the storage device.

16. The system of claim 14, wherein the processor is further configured to:
generate a map of data locations associated with the storage device, wherein the map of data locations is generated based on one or more correlations between physical representations and logical representations of the data saved on the storage device; and
identify the data saved in the sectors adjacent to the damaged sectors of the storage device based on the generated map.

17. The system of claim 14, wherein the information specifying the state of the storage device is received from corresponding information sources comprising at least one of a computer device communicatively coupled to the storage device, a diagnostic module, and a service program configured to gather and review information associated with a state of the storage device, operations of the storage device, and characteristics of the storage device.

18. The system of claim 17, wherein the service program is configured to interact with a Self-Monitoring, Analysis and Reporting Technology (S.M.A.R.T.) module of the storage device to obtain a first parameter associated with the degradation of the storage device and a second parameter associated with an operating time of the storage device.

19. The system of claim 14, wherein the received information comprises at least one of (i) information specifying parameters of the storage device based on one or more Self-Monitoring, Analysis and Reporting Technology (S.M.A.R.T.) attribute values obtained from one or more S.M.A.R.T. counters; (ii) information specifying a temperature reading of the storage device; (iii) information specifying results of previous degradation assessments of the storage device; (iv) historical information on operations of the storage device; and (v) information specifying a use intensity of the storage device.

20. A non-transitory computer readable medium comprising computer executable instructions for preserving data saved on a storage device, including instructions for:

receiving information specifying a state of the storage device;

determining a degradation assessment of the storage device based on the received information, wherein the degradation assessment comprises a degradation rate of the storage device and a probability of failure of the storage device;

responsive to determining that the probability of failure is greater than a given threshold, identifying one or more damaged sectors of the storage device by scanning a surface of the storage device;

determining a worth grade of data saved at least in sectors adjacent to the damaged sectors of the storage device based on an analysis of metadata of the data saved on the storage device;

determining at least one backup option for the preservation of the data saved on the storage device based on the determined worth grade of data and the degradation rate of the storage device; and creating a backup copy of the data saved on the storage device based on the determined at least one backup option.

* * * * *